United States Patent
Chen et al.

(10) Patent No.: US 7,668,356 B2
(45) Date of Patent: Feb. 23, 2010

(54) AUTOMATIC DETERMINATION OF JOINT SPACE WIDTH FROM HAND RADIOGRAPHS

(75) Inventors: Hong Chen, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 777 days.

(21) Appl. No.: 11/482,445

(22) Filed: Jul. 7, 2006

(65) Prior Publication Data

US 2007/0031015 A1   Feb. 8, 2007

Related U.S. Application Data

(60) Provisional application No. 60/705,133, filed on Aug. 3, 2005.

(51) Int. Cl.
*G06K 9/00* (2006.01)
(52) U.S. Cl. .................. 382/128; 382/100; 128/922
(58) Field of Classification Search .................. 382/100, 382/106, 128, 131, 132, 151; 600/410, 407, 600/425, 415; 128/920, 922, 898
See application file for complete search history.

(56) References Cited

U.S. PATENT DOCUMENTS

| | | | | |
|---|---|---|---|---|
| 5,696,805 A | * | 12/1997 | Gaborski et al. | 378/54 |
| 6,246,745 B1 | * | 6/2001 | Bi et al. | 378/54 |
| 6,711,282 B1 | * | 3/2004 | Liu et al. | 382/132 |
| 2005/0240094 A1 | * | 10/2005 | Pichon et al. | 600/407 |

* cited by examiner

*Primary Examiner*—Brian P Werner
*Assistant Examiner*—Jason Heidemann
(74) *Attorney, Agent, or Firm*—Donald B. Paschburg; F. Chau & Associates, LLC

(57) ABSTRACT

A computer-implemented method for determining a joint space width includes providing image data for a skeleton, thresholding the image data, and performing a connected component analysis on thresholded image data. The method further includes extracting contours of the thresholded image data according to the connected component analysis, performing a skeletonization of the thresholded image data using a first fast marching analysis of the thresholded image data, locating at least one finger joint of skeletonized image data, extracting bone boundaries using a second fast marching analysis of gradient information of the image data inside a region of interest, which includes a finger joint of the at least one finger joint, determining the joint space width given extracted bone boundaries, and outputting the joint space width.

17 Claims, 6 Drawing Sheets

AUTOMATIC DETERMINATION OF JOINT SPACE WIDTH FROM HAND RADIOGRAPHS

CROSS-REFERENCE TO RELATED APPLICATIONS

This application claims the benefit of Provisional Application No. 60/705,133 filed on Aug. 3, 2005 in the United States Patent and Trademark Office, the contents of which are herein incorporated by reference in its entirety.

BACKGROUND OF THE INVENTION

1. Field of the Invention

The present disclosure relates to image processing, and more particularly to a system and method for automatic determination of joint space width from skeleton images.

2. Description of Related Art

Rheumatoid Arthritis (RA) is one of the most common incurable diseases. Hand radiographs are commonly used to assess joint damage and monitor the progression of disease and response to treatment. Manual measurement of joint space width (JSW) is time-consuming and highly prone to inter- and intra-observer variation.

The methods in the literature use elastic registration or active appearance models for segmentation of hand radiographs. These methods rely on training data, so the method is constrained or biased by the training data, thus resulting in incorrect registration of uncommon hand shapes and inaccurately extracted bone boundaries.

SUMMARY OF THE INVENTION

According to an embodiment of the present disclosure, a computer-implemented method for determining a joint space width includes providing image data for a skeleton, thresholding the image data, and performing a connected component analysis on thresholded image data. The method further includes extracting contours of the thresholded image data according to the connected component analysis, performing a skeletonization of the thresholded image data using a first fast marching analysis of the thresholded image data, locating at least one finger joint of skeletonized image data, extracting bone boundaries using a second fast marching analysis of gradient information of the image data inside a region of interest, which includes a finger joint of the at least one finger joint, determining the joint space width given extracted bone boundaries, and outputting the joint space width.

According to an embodiment of the present disclosure, a program storage device is provided, readable by machine, tangibly embodying a program of instructions executable by the machine to perform method steps for determining a joint space width. The method includes providing image data for a skeleton, thresholding the image data, and performing a connected component analysis on thresholded image data. The method further includes extracting contours of the thresholded image data according to the connected component analysis, detecting a tip of at least one finger from the contour. The method further includes performing a skeletonization of the thresholded image data using a fast marching analysis of the thresholded image data, locating at least one finger joint of skeletonized image data, extracting bone boundaries using the fast marching analysis of gradient information of the image data inside a region of interest, which includes a finger joint of the at least one finger joint, determining the joint space width given extracted bone boundaries, and outputting the joint space width.

According to an embodiment of the present disclosure, a computer-implemented method for determining a joint space width includes providing image data for a skeleton, thresholding the image data, extracting a contour of the thresholded image data, and detecting a tip of at least one finger from the contour. The method further includes performing a skeletonization of the thresholded image data using a fast marching analysis of the threshold image data, locating at least one finger joint of skeletonized image data, extracting bone boundaries using the fast marching analysis of gradient information of the image data, the tip of the at least one finger, and a location of the at least one finger joint, determining the joint space width given extracted bone boundaries, and outputting the joint space width.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a method for automatic evaluation of joint space width (JSW) uses a fast marching-based method.

Automatic assessment of JSW from hand radiographs uses the location of hand joints and extraction of bone boundaries. A joint location method needs to be robust to variations of hand shapes and finger positions, and even pathological deformation of hands in the late stages of joint disease. The extraction of bone boundaries is also challenged by poorly defined bone edges due to the narrowing of joint spaces.

According to an embodiment of the present disclosure, a method for automatic evaluation of JSW includes automatic evaluation of JSW using a fast marching method. The fast marching method searches for a global minimum of goal energy and provides a robust solution. Training data is not used, so the method is less constrained or biased by the training data, and more robust with variations of finger shape and positions. The fast marching method allows straightforward implementation of interactive local corrections to the results. The fast marching method may be combined with active contour models for boundary extraction. The fast marching method determines a fastest path, which corresponds to a boundary given proper setting of a propagation speed. The proposed skeleton extraction and boundary extraction methods can also be used for other applications.

Figure 1:
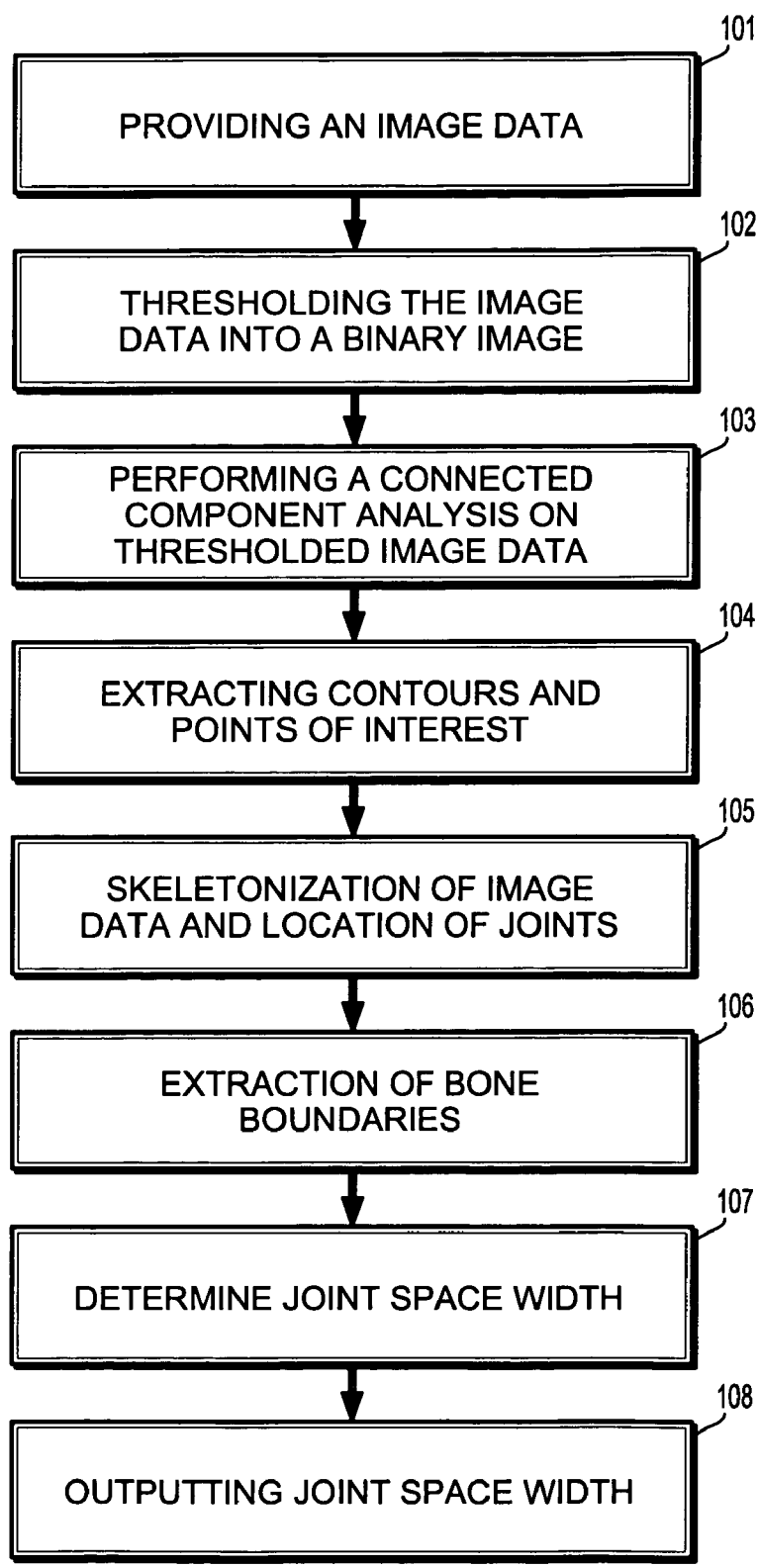
FIG. 1 illustrates a method for determining joint space width, according to an embodiment of the present disclosure.
Figure 2:
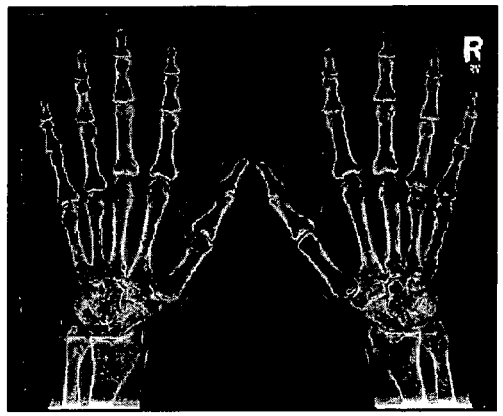
FIG. 2 is an image of skeleton, according to an embodiment of the present disclosure.
Figure 3:
FIG. 3 shows the image of FIG. 2 after thresholding, according to an embodiment of the present disclosure.
Figure 4:
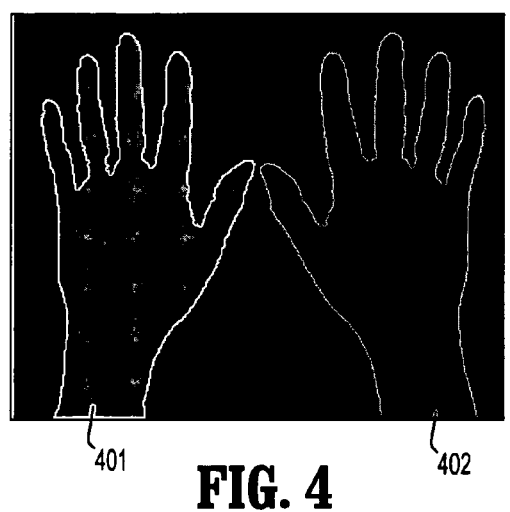
FIG. 4 shows the image of FIG. 3 after performing a connected component analysis, according to an embodiment of the present disclosure.
Figure 5:
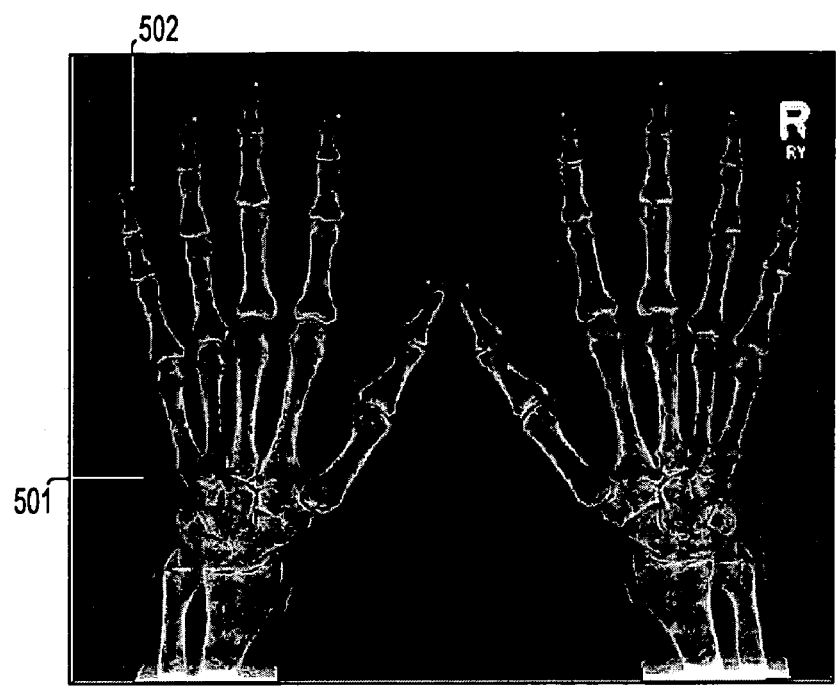
FIG. 5 shows extracted contours and points of interest from the image of FIG. 4, according to an embodiment of the present disclosure.

Referring to FIG. 1, a method for automatic evaluation of JSW includes providing image data 101, thresholding the image data 102 and performing a connected component analysis on thresholded image data 103. An original hand radiograph image (see FIG. 2) is thresholded into a binary image (see FIG. 3). The threshold is the first local minimum after the highest peak in the intensity histogram 102. Connected components in the binary image are extracted and components with small area, e.g., the annotations in the radiographs, are removed 103. The small areas maybe detected as those having an area less than a threshold area, for example, set by a user. FIG. 4 shows a hand region after connected component analysis and removal of small regions, which has identified two features 401/402, in these example hands. The contours (e.g., 501) of the hands are extracted, and the fingertips (e.g., 502) are detected using the local optima in the contours' y coordinate plot 104 (see FIG. 5).

The method performs a skeletonization of image data and the location of joints 105. A fast marching method is used to find a fastest path (e.g., 601) between a start point and an end point or end points by propagating a wave from the start point (see FIG. 6). When the wave front touches the end point or one of the end points, a fastest path is extracted by tracking the steepest gradient descent from a touched end point back to the start point. The wave propagation is described with the Eikonal equation $$|\nabla T| F(x,y) = 1, \quad (1)$$

where, $$F(x, y) = \begin{cases} ((I(x, y) - \min)/(\max - \min))^{10} + 0.01, & \text{if } (x, y) \text{ is inside the hand region,} \\ 0.01, & \text{otherwise,} \end{cases} \quad (2)$$

and I (x,y) is the gray level value of pixel (x,y), and min and max are the minimum and the maximum intensity values of pixels inside the hand region.

Skeletonization of hand image data may be performed as follows. The fastest path, A, from the thumb tip to the pinky finger's tip is determined. The fastest path is established from the tip of the middle finger to the path A. The connecting point of the two paths is called hand center, C. The shortest paths from C to the tips of the index and ring fingers are determined. In this manner, the skeleton of the hand is extracted, with each branch of the skeleton corresponding to a finger.

Figure 6:
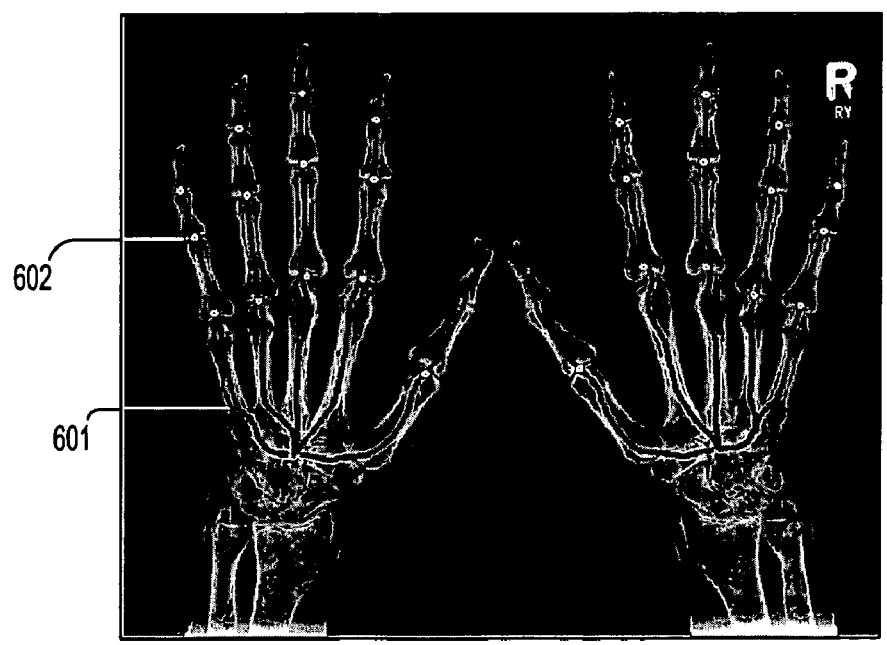
FIG. 6 a skeletonization of the image of FIG. 5, including a determination of joints, according to an embodiment of the present disclosure.

The joints (e.g., 602) with larger gradients in each branch are detected as joint locations (see FIG. 6). FIG. 6 shows hand skeleton shown as lines, and locations of joints shown as dots.

Figure 7A:
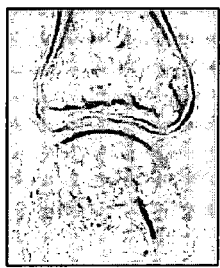
FIGS. 7A-D illustrate an extraction of bone boundaries, according to an embodiment of the present disclosure.
Figure 7B:
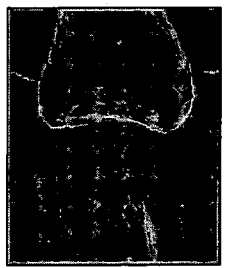
Figure 7C:
Figure 7D:
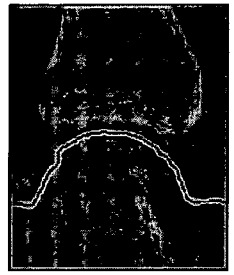

The method includes extracting bone boundaries 106. A region of interest (ROI) is set at each joint location. For extracting the upper bone boundary, the gradients pointing towards the interior of the upper bone are set to be positive, while other gradients are set to be negative (FIG. 7A). The procedure is formulated as $$R(x,y) = -\text{sign}(\overrightarrow{G(x,y)} \cdot \overrightarrow{(x-x0, y-y0)}) \cdot |\overrightarrow{G(x,y)}|, \quad (3)$$

where $\overrightarrow{G(x,y)}$ is the gradient vector, R(x,y) is the value at (x,y) used for setting propagation speed, (x0,y0) is a point inside the upper bone boundary, and sign(.) is the sign function. The wave propagation speed is set with equation (2). A wave is propagated from one side of the bone to the other side. The fastest path is the bone boundary (see FIG. 7B). The same method is used to extract the lower bone boundary (see FIGS. 7C-D).

The joints of interest include all metacarpal-phalangeal and inter-phalangeal joints, except for the distal thumb joints, which are typically poorly visualized in hand radiographs. This results in 13 joints per hand or 26 joints per patient. Extracted bone boundaries for all target joints in a two-hand radiograph image are shown in FIG. 8A.

Referring again to FIGS. 7A-D, the extraction of bone boundaries includes a gradient field for extraction of upper bone boundary (see FIG. 7A); extracting a boundary of the upper bone (see FIG. 7B); gradient field for extraction of lower bone boundary (see FIG. 7C); and extracting a boundary of the lower bone (see FIG. 7D).

The method includes the determination of joint space width 107. The joint space width is determined based on the sections of the boundaries that form the joint space (see FIG. 8B). For each point in the upper bone boundary, the closest point in the lower bone boundary is selected. Excluding both ends of the boundaries where the point pairs have a distance larger than a threshold (e.g., minimal distance+a constant), the distances of the remaining point pairs are averaged to determine the joint space width.

Figure 8A:
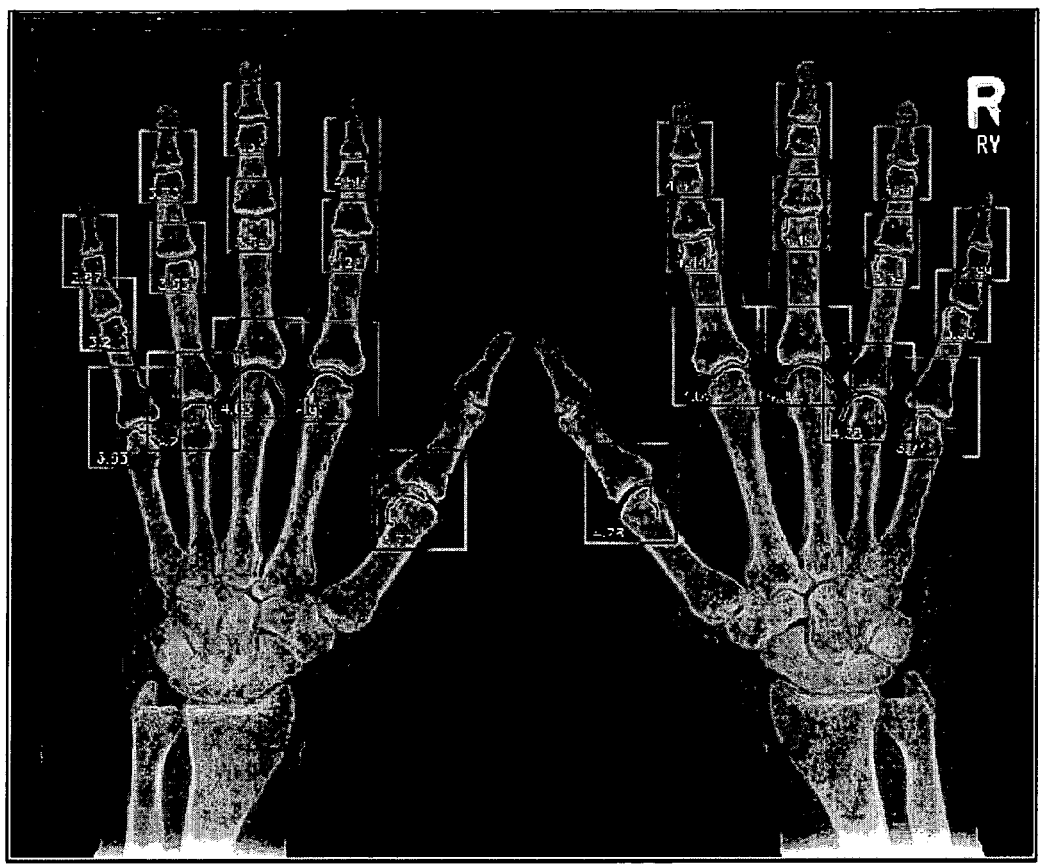
FIG. 8A shows an example of outputted images including joint space widths, according to an embodiment of the present disclosure.
Figure 8B:
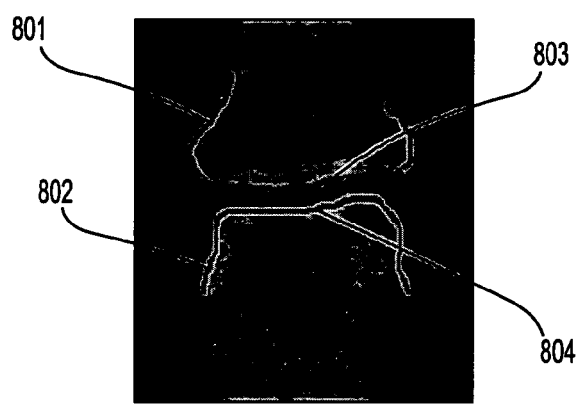
FIG. 8B shows a detailed joint of FIG. 8A, according to an embodiment of the present disclosure.

FIGS. 8A-B illustrate the determination of mean joint space width, including the boundaries for all target joints that are automatically extracted (see FIG. 8A). The numbers shown are the determined joint space widths. A detailed view of the determination of joint space width is shown in FIG. 8B.

The dark lines, e.g., 801 and 802 are the extracted bone boundaries, and the bright lines, e.g., 803 and 804, are the sections of the boundaries used for computation of the joint space width.

The determined joint space width(s) may be output to, for example, a printer or a display for analysis, or a computer system (e.g., a storage media). The output may be text (e.g., a listing of joints and joint space widths), graphical, image based (see for example FIG. 8A), or a combination thereof.

A method according to an embodiment of the present disclosure was evaluated on a test set, including 8 two-hand radiograph images, including normal hands and hands with joint damage due to arthritis, gout and psoriasis. The 13 target joints of each hand are all the metacarpal-phalangeal and inter-phalangeal joints, except for the distal thumb joints, which are typically poorly visualized in a hand radiograph. Using the automatic method, of the 208 target joints (13 joints per hand times two hands times 8 patients), 97% were correctly located, and 89% of 416 bone boundaries (2 boundaries per joint) were correctly extracted. The entire process takes ~80 seconds for a two-hand radiograph image on a PC with 1.60 GHz Pentium M processor.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 9:
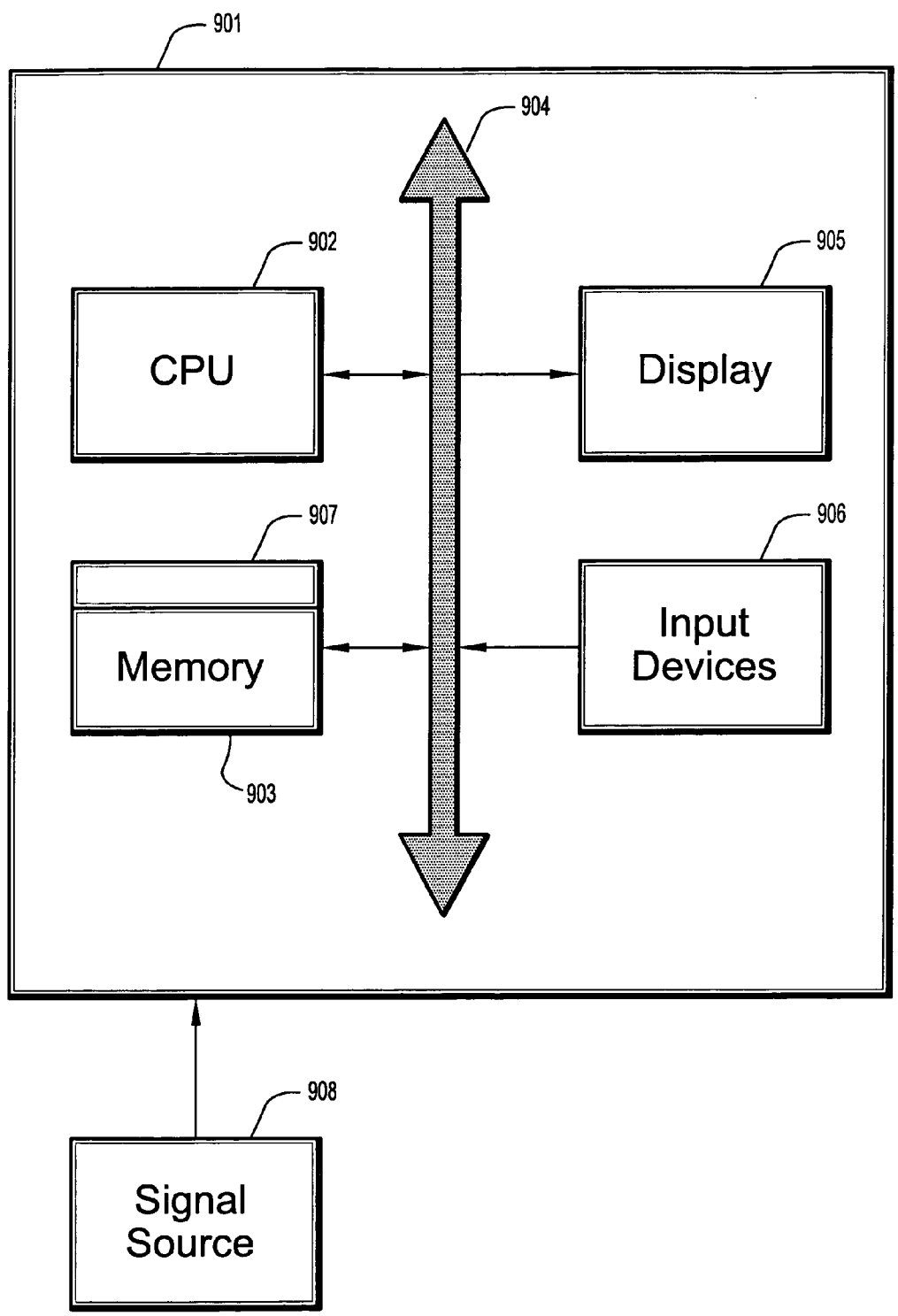
FIG. 9 is a diagram of a system according to an embodiment of the present disclosure.

Referring to FIG. 9, according to an embodiment of the present disclosure, a computer system 901 for determination of joint space width from skeleton images can comprise, inter alia, a central processing unit (CPU) 902, a memory 903 and an input/output (I/O) interface 904. The computer system 901 is generally coupled through the I/O interface 904 to a display 905 and various input devices 906 such as a mouse and keyboard. The support circuits can include circuits such as cache, power supplies, clock circuits, and a communications bus. The memory 903 can include random access memory (RAM), read only memory (ROM), disk drive, tape drive, etc., or a combination thereof. The present invention can be implemented as a routine 907 that is stored in memory 903 and executed by the CPU 902 to process the signal from the signal source 908. As such, the computer system 901 is a general-purpose computer system that becomes a specific purpose computer system when executing the routine 907 of the present invention.

The computer platform 901 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for determination of joint space width from skeleton images, it is noted that modifications and variations can be made by persons skilled in the art in light of the above teachings. It is therefore to be understood that changes may be made in embodiments of the present disclosure that are within the scope and spirit thereof.

What is claimed is:

1. A computer-implemented method for determining a joint space width comprising:
   providing image data for a skeleton;
   thresholding the image data;
   performing a connected component analysis on thresholded image data;
   extracting contours of the thresholded image data, given the connected component analysis;
   performing a skeletonization of the thresholded image data using a first fast marching analysis of the threshold image data;
   locating at least one finger joint of skeletonized image data;
   extracting bone boundaries using a second fast marching analysis of gradient information of the image data inside a region of interest, which includes a finger joint of the at least one finger joint;
   determining the joint space width given extracted bone boundaries; and
   outputting the joint space width.

2. The computer-implemented method of claim 1, wherein extracting contours further comprises determining at least one end point of the skeleton.

3. The computer-implemented method of claim 2, wherein the fast marching analysis comprises:
   providing a start point; and
   determining a path between the start point and the at least one end point, according to pixel intensity values of the thresholded image data.

4. The computer-implemented method of claim 1, wherein extracting bone boundaries comprises:
   setting a region of interest for the at least one joint;
   extracting a first bone boundary of the at least one joint; and
   extracting a second bone boundary of the at least one joint.

5. The computer-implemented method of claim 4, wherein determining the joint space width comprises averaging distances of point pairs of the first bone boundary and the second bone boundary to determine the joint space width.

6. The computer-implemented method of claim 5, further comprising:
   determining for each point on the first bone boundary, a closest point on the second bone boundary; and
   excluding point pairs having a distance greater than a threshold.

7. A program storage device readable by machine, tangibly embodying a program of instructions executable by the machine to perform method steps for determining a joint space width, the method steps comprising:
   providing image data for a skeleton;
   thresholding the image data;
   performing a connected component analysis on thresholded image data;
   extracting contours of the thresholded image data according to the connected component analysis;
   performing a skeletonization of the thresholded image data using a first fast marching analysis of the threshold image data;
   locating at least one finger joint of skeletonized image data;
   extracting bone boundaries using a second fast marching analysis of gradient information of the image data inside a region of interest, which includes a finger joint of the at least one finger joint;
   determining the joint space width given extracted bone boundaries; and
   outputting the joint space width.

8. The method of claim 7, wherein extracting contours further comprises determining at least one end point of the skeleton.

9. The method of claim 8, wherein the fast marching analysis comprises:
   providing a start point; and
   determining a path between the start point and the at least one end point, according to pixel intensity values of the thresholded image data.

10. The method of claim 7, wherein extracting bone boundaries comprises:
    setting a region of interest for the at least one joint;
    extracting a first bone boundary of the at least one joint; and
    extracting a second bone boundary of the at least one joint.

11. The method of claim 10, wherein determining the joint space width comprises averaging distances of point pairs of the first bone boundary and the second bone boundary to determine the joint space width.

12. The method of claim 11, further comprising:
determining for each point on the first bone boundary, a closest point on the second bone boundary; and excluding point pairs having a distance greater than a threshold.

13. A computer-implemented method for determining a joint space width comprising:
providing image data for a skeleton;
thresholding the image data;
extracting a contour of the thresholded image data;
detecting a tip of at least one finger from the contour;
performing a skeletonization of the thresholded image data using a fast marching analysis of the threshold image data;
locating at least one finger joint of skeletonized image data;
extracting bone boundaries using the fast marching analysis of gradient information of the image data, the tip of the at least one finger, and a location of the at least one finger joint;
determining the joint space width given extracted bone boundaries; and
outputting the joint space width.

14. The method of claim 13, wherein the fast marching analysis comprises:
providing a start point; and
determining a path between the start point and the tip of the at least one finger, according to pixel intensity values of the thresholded image data.

15. The method of claim 13, wherein extracting bone boundaries comprises:
setting a region of interest for the at least one joint;
extracting a first bone boundary of the at least one joint; and
extracting a second bone boundary of the at least one joint.

16. The method of claim 13, wherein determining the joint space width comprises averaging distances of point pairs of the first bone boundary and the second bone boundary to determine the joint space width.

17. The method of claim 16, further comprising:
determining for each point on the first bone boundary, a closest point on the second bone boundary; and
excluding point pairs having a distance greater than a threshold.

* * * * *

UNITED STATES PATENT AND TRADEMARK OFFICE
CERTIFICATE OF CORRECTION

PATENT NO. : 7,668,356 B2  Page 1 of 1
APPLICATION NO. : 11/482445
DATED : February 23, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Twenty-eighth Day of December, 2010

David J. Kappos
*Director of the United States Patent and Trademark Office*